Oct. 30, 1956     L. W. JANSON     2,768,830
FLUID OPERATED CHUCK

Filed Sept. 15, 1954     2 Sheets-Sheet 1

LEROY W. JANSON
INVENTOR.

LEROY W. JANSON
INVENTOR.

United States Patent Office 2,768,830
Patented Oct. 30, 1956

2,768,830

FLUID OPERATED CHUCK

Leroy W. Janson, Clarks Summit, Pa., assignor to Sprague & Henwood, Incorporated, Scranton, Pa., a corporation of Pennsylvania Application September 15, 1954, Serial No. 456,240

5 Claims. (Cl. 279—4)

This invention relates to an improvement in chucks, particularly to improvements in fluid-operated chucks.

One of the objects of my invention is to provide a fluid-operated chuck, particularly well adapted for diamond core drilling, in which, after the drill rod has been fed into the ground two or three feet, the chuck may be released, raised on the rod, and then reclamped for a second cycle by the simple manipulation of a valve conveniently located near the operator. This permits a very much faster operation than with the present-day type of mechanical chuck, wherein, after the drill rod is fed into the ground for a short distance, the chuck must be loosened from the drill rod with a wrench, and then, after the chuck is raised, it must be tightened again with a wrench for the next feeding operation.

In general, my improved chuck comprises a non-rotating outer body and a rotatable inner chuck body. The drill rod passes through the inner chuck body and is clamped thereto by the chuck jaws. Fluid pressure is introduced into the chuck through the non-rotating outer body, forcing one section of this body outwardly axially of the chuck to close or clamp the chuck jaws upon the drill rod. Rotation of the inner chuck body will then effect rotation of the drill rod along with the boring tool on the end thereof and advance the tool into the material being drilled. Upon release of this fluid pressure, that part of the non-rotatable outer body which was forced downwardly by the pressure is restored to its initial position, and the chuck jaws are opened. The chuck may then be raised to any extent desired with respect to the drill rod and the cycle repeated.

In the accompanying drawings, wherein I have illustrated an embodiment of my invention, Fig. 1 is a sectional, elevational view of my improved chuck;

Figure 1:
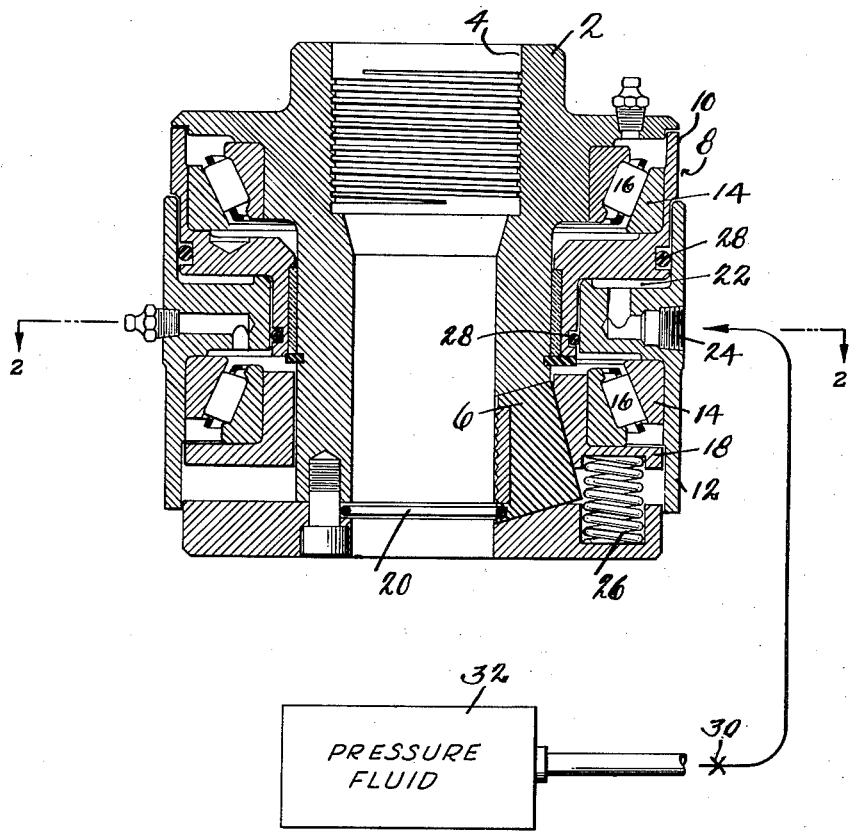
Figure 2:
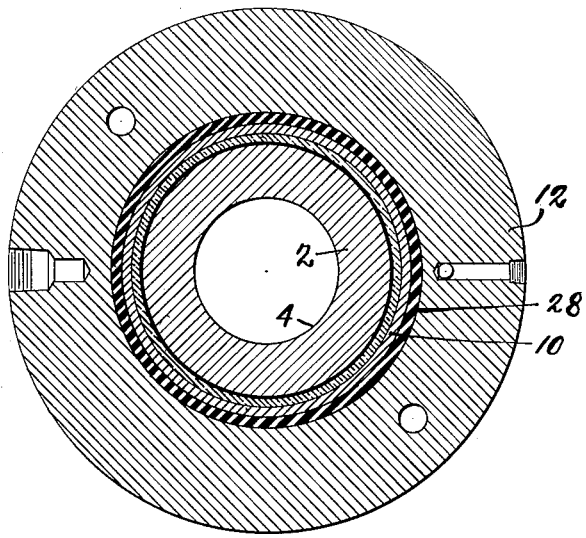
Fig. 2 is a section on the line 2—2 of Fig. 1.
Figure 3:
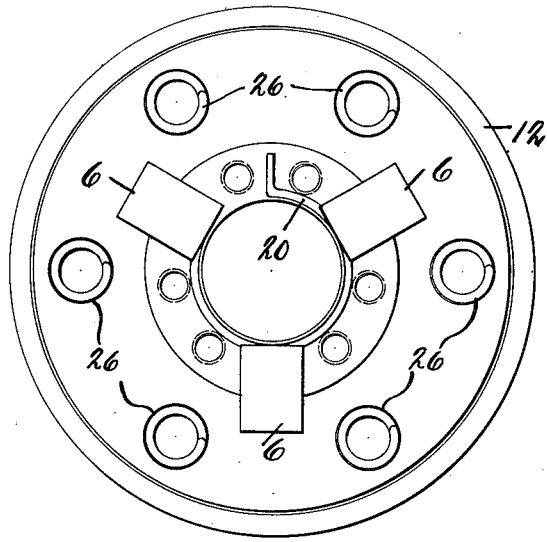
Fig. 3 is a bottom plan view with the bottom plate of the chuck removed.

Referring to the drawings in detail, my improved chuck is cylindrical in general outline and comprises a rotatable inner chuck body 2, provided with a central bore 4 for the reception of the drill rod which is to be gripped and rotated by the chuck. The jaws of the chuck, of which there are three spaced 120° apart, are designated 6 and comprise blocks set about the periphery of the inner chuck body adjacent its outer end.

As above indicated, it is one of the objects of my invention to provide a chuck in which these chuck jaws 6 are moved radially of the chuck into clamping position by fluid pressure, introduced into the chuck through the wall of the chuck.

In addition to the inner rotatable chuck body 2, my improved chuck comprises an outer non-rotatable chuck body 8. This body comprises two cylindrical shells 10 and 12, disposed concentrically with respect to each other and relatively to the inner chuck body. Each of these shells is provided with bearing cups 14 for the accommodation of bearing members 16, to provide for rotation of the inner chuck body 2 relatively to the non-rotatable outer chuck body 8. The outer face of each of the chuck jaws 6 is outwardly tapered, and surrounding these tapered jaws and set into the inner chuck body is a cam plate 18, which, as will shortly be explained, is movable along the inclined faces of the chuck jaws 6, this cam plate being in the form of a ring surrounding all three jaws, so that, when the cam plate is moved toward the bottom of the chuck, it will cause the chuck jaws to be contracted to grip the drill rod lying in the bore of the chuck body, and when the cam plate is moved in the opposite direction, the chuck jaws are then free to be restored to their original open position.

I might add at this point that the jaws are caused to open or be restored to their original open position by a jaw return spring 20, which, as quite apparent from the drawings, is a split spring ring set into the lower end of the chuck jaws.

The shells 10 and 12, constituting the outer chuck body, in addition to telescoping each other, are so formed interiorly as to provide an annular chamber, designated 22, between the two shells, provision being made at 24 for introducing oil or other fluid under pressure through one of the chuck shells to the annular chamber.

The shell 12, in addition to telescoping the shell 10, is capable of being moved axially of the chuck with respect to shell 10, so that, when fluid under pressure is supplied to the annular chamber 22, the shell 12 will be moved axially outwardly of the chuck and will carry with it the lower bearings 16, as well as the cam plate 18 to close the chuck jaws 6 upon the drill rod.

26 designates a plurality of return springs carried in the lower or outer end of the inner chuck body. These springs are compressed upon the downward movement of the cam plate 18 when closing the chuck jaws.

To prevent leakage of fluid out of the annular chamber 22 between the shells 10 and 12, I provide O-rings 28.

To open the chuck, that is to say, to open the chuck jaws 6, it is merely necessary to exhaust the pressure fluid from the annular chamber 22, which may be accomplished by the use of a valve of conventional design, and which, as will be understood by those skilled in the art, permits oil to be fed to the chamber 22 or to be discharged or bled therefrom. I have merely indicated diagrammatically a valve and a fluid pressure supply at 30 and 32, respectively.

When my improved chuck is employed for diamond core drilling, it will be mounted on the hydraulic swivel head of a core drilling machine. However, the core drilling machine constitutes no part of my invention and, hence, has not been shown on the drawings. The novelty of my invention resides in the construction of the chuck, regardless of the use to which the chuck may be put.

It will be appreciated, of course, that, to shift the chuck on the drill rod for a new cycle, it is merely necessary to manipulate the valve 30 to permit the pressure fluid to discharge from the chamber 22, the return springs 26 thereupon restoring the cam plate 18 and shell 12 etc. to initial position, and the expansion spring ring 20 opening the chuck jaws so as to permit the chuck to be raised along the drill rod.

It is to be understood that changes may be made in the details of construction and arrangement of parts hereinabove described without departing from the spirit and scope of my invention.

What I claim is:

1. A chuck comprising, in combination, an inner rotatable body provided with a plurality of chuck jaws movable radially of said body but fixed against axial movement; an outer non-rotatable chuck body surrounding said inner body, said outer body comprising two shells disposed in telescopic relation with a space between them providing an annular chamber, one of said outer body members being slidable axially of the chuck relatively to the other; and a cam plate movable axially of the chuck and interposed between said slidable body member and said chuck jaws and contacting both whereby, when fluid under pressure is admitted to said annular chamber, said chuck jaws will be actuated radially of the chuck to operative position.

2. A chuck comprising, in combination, an inner rotatable body provided with a plurality of chuck jaws movable radially of the chuck but fixed against axial movement; an outer, concentric, non-rotatable chuck body surrounding said inner body, said outer body comprising two concentric shells disposed in telescopic relation with a space between them providing an annular chamber, one of said outer body members being slidable axially of the chuck relatively to the other; a cam plate between the said slidable body member and said chuck jaws and engaging both body member and jaws whereby, when fluid under pressure is admitted to said annular chamber, said chuck jaws will be actuated radially of the inner body of the chuck to operative position; and springs for returning said cam plate and the cooperating slidable body member to initial position upon the release of the fluid pressure in said annular chamber.

3. A chuck comprising, in combination, an inner rotatable chuck body provided with a plurality of chuck jaws fixed against movement axially of the chuck; an outer non-rotatable chuck body comprising two concentric shells disposed in telescopic relation surrounding and concentric with said inner chuck body, the shells constituting the outer chuck body, being so shaped as to provide an annular chamber within the outer chuck body; a cam plate between one of the shells of the outer chuck body and the said chuck jaws; means for supplying pressure fluid through one of said telescoped shells to said annular chamber to effect movement of one of said shells axially of the chuck and a similar movement to said cam plate, to cam the chuck jaws radially of the chuck to operative position; and a plurality of springs mounted in the inner chuck body, said springs being compressed when pressure fluid is supplied to said annular chamber, said springs restoring the cam plate and the cooperating, axially movable outer body member to initial position when pressure in the annular chamber is lowered.

4. A chuck comprising, in combination, an inner chuck body; a concentric, outer, non-rotatable chuck body; bearings between the two chuck bodies providing for rotation of the inner chuck body within the non-rotatable outer chuck body; a plurality of adjustable chuck jaws carried by the inner chuck body fixed against movement axially of the chuck, said outer chuck body comprising two concentric telescoping shells surrounding the inner chuck body, so shaped and relatively disposed as to provide an annular chamber between them; sealing rings above and below the confines of the said chamber, to prevent the passage of fluid out of said chamber between the two shells, one of the shells of the outer chuck body being movable axially of the chuck; a cam ring between the said axially movable shell and the said chuck jaws; means for supplying pressure fluid to said annular chamber, thereby to effect axial movement of the movable shell of the outer chuck body, correspondingly to move said cam ring to effect movement of the chuck jaws radially of the chuck; and means for expanding the chuck jaws radially of the chuck to their initial position upon restoration of the cam ring and the movable shell to their original positions when the pressure in said annular chamber is lowered.

5. A chuck comprising an inner rotatable chuck body; a plurality of blocks set into the chuck body about the body periphery adjacent the outer end of the body, said blocks providing jaws for the chuck; an expansion spring ring within the chuck body for holding said jaws in expanded position; an outer chuck body comprising a pair of concentrically disposed shells surrounding the inner chuck body; sets of upper and lower bearings between the inner and outer chuck bodies to promote rotation of the inner body relatively to the outer non-rotatable chuck body, the outer shell of the outer chuck body being disposed in telescopic relation to its companion shell with a space between the two providing an annular chamber; a cam ring surrounding the chuck jaws and disposed between said jaws and one of the shells constituting the outer chuck body; and means for introducing pressure fluid to said annular chamber through one of said shells, to effect axial movement of one of the shells, the bearings carried thereby, and the cam ring relatively to the said chuck jaws to close the same.

References Cited in the file of this patent

UNITED STATES PATENTS

| 2,462,155 | Benjamin et al. | Feb. 22, 1949 |
| 2,504,186 | De Munck | Apr. 18, 1950 |
| 2,587,230 | Schaad | Feb. 26, 1952 |

FOREIGN PATENTS

| 391,295 | Great Britain | Apr. 27, 1933 |